United States Patent
Conete

(10) Patent No.: US 8,919,136 B2
(45) Date of Patent: Dec. 30, 2014

(54) FLEXIBLE ABUTMENT LINKS FOR ATTACHING A PART MADE OF CMC

(75) Inventor: Eric Conete, Merignac (FR)

(73) Assignee: Herakles, Le Haillan (FR)

( * ) Notice: Subject to any disclaimer, the term of this patent is extended or adjusted under 35 U.S.C. 154(b) by 967 days.

(21) Appl. No.: 13/062,617

(22) PCT Filed: Sep. 8, 2009

(86) PCT No.: PCT/FR2009/051684
§ 371 (c)(1),
(2), (4) Date: Apr. 28, 2011

(87) PCT Pub. No.: WO2010/026354
PCT Pub. Date: Mar. 11, 2010

(65) Prior Publication Data
US 2011/0203255 A1 Aug. 25, 2011

(30) Foreign Application Priority Data
Sep. 8, 2008 (FR) ..................................... 08 56009

(51) Int. Cl.
*F02K 1/04* (2006.01)
*F02K 1/80* (2006.01)

(52) U.S. Cl.
CPC ... *F02K 1/80* (2013.01); *F02K 1/04* (2013.01); *F05D 2230/642* (2013.01)
USPC .............................................. 60/799; 60/796

(58) Field of Classification Search
CPC ........ F02K 1/04; F02K 1/80; F05D 2230/642
USPC ......................... 60/226.1, 796, 799, 800, 761; 239/265.11; 244/54
See application file for complete search history.

(56) References Cited

U.S. PATENT DOCUMENTS

| 5,249,877 | A | 10/1993 | Corsmeier |
| 5,603,471 | A * | 2/1997 | Armstrong ................. 244/53 R |
| 6,647,729 | B2 * | 11/2003 | Calvez et al. ................... 60/753 |
| 6,668,559 | B2 * | 12/2003 | Calvez et al. ................... 60/796 |
| 6,675,585 | B2 * | 1/2004 | Calvez et al. ................... 60/796 |
| 6,708,495 | B2 * | 3/2004 | Calvez et al. ................... 60/753 |
| 2007/0107710 | A1 * | 5/2007 | De Sousa et al. ............. 123/657 |
| 2008/0104941 | A1 * | 5/2008 | Blanchard et al. .............. 60/272 |
| 2008/0115484 | A1 * | 5/2008 | Conete et al. .................. 60/262 |

FOREIGN PATENT DOCUMENTS

| EP | 0 316 233 A1 | 5/1989 |
| EP | 1 873 385 A2 | 1/2008 |
| FR | 2 912 469 A1 | 8/2008 |
| WO | WO 2008/139114 A1 | 11/2008 |
| WO | WO 2008/148999 A2 | 12/2008 |

OTHER PUBLICATIONS

International Search Report corresponding to PCT/FR2009/051684, dated Mar. 31, 2010.

* cited by examiner

*Primary Examiner* — William H Rodriguez
*Assistant Examiner* — Carlos A Rivera
(74) *Attorney, Agent, or Firm* — Pillsbury Winthrop Shaw Pittman, LLP

(57) ABSTRACT

An after-body assembly for an aeroengine, the assembly comprising an annular part (60) made of metallic material secured to the aeroengine and an after-body part (20) made of ceramic matrix composite material, the after-body part (20) being mounted on the annular part (60) by resiliently flexible fastener tabs (70) and having a first end (71) fastened to the annular part (60) and a second end (72) fastened to the upstream portion of the after-body part (20). Each fastener tab (70) includes an axial abutment element (720) that extends radially from the second end (72) of the tab and having at least a portion thereof facing the first end (71). The fastener tab (70) also includes a radial abutment element (721) at the second end (72) of the tab, the radial abutment element (721) at least partially overlying the first end (71).

12 Claims, 5 Drawing Sheets

FLEXIBLE ABUTMENT LINKS FOR ATTACHING A PART MADE OF CMC

CROSS-REFERENCE TO RELATED APPLICATIONS

This application is the U.S. National Stage of PCT/FR2009/051684, filed Sep. 8, 2009, which in turn claims priority to French Application No. 0856009, filed Sep. 8, 2008. The content of both applications are incorporated herein by reference in their entirety.

BACKGROUND OF THE INVENTION

The present invention relates to fastening composite material parts that are used in the after-bodies of aeroengines such as turbojets. In order to reduce after-body weight, it is known to make one or more after-body parts, such as the exhaust cone, the primary nozzle, and/or the mixer, out of a ceramic matrix composite (CMC) material rather than out of a metallic material. Such parts present a coefficient of thermal expansion that is small compared with that of the metal casings of the engine to which they need to be mounted. In order to compensate for differential expansion between these elements, the CMC part is mounted on the casing made of metallic material by means of resiliently flexible fastener tabs that are generally made of a refractory metallic material.

The use of flexible fastener tabs for mounting a CMC mixer is described in particular in the following documents: US 2008/115484; WO 2008/139114; and FR 2 912 469. Document WO 2008/148999 describes using flexible fastener tabs for fastening exhaust nozzles in a gas turbine. Document EP 1 873 385 discloses and after-body assembly comprising an exhaust cone held facing an annular part by means of flexible fastener tabs.

In addition to compensating differential expansion, the fastener tabs must also enable the assembly to withstand the normal and limit loads that are encountered by the engine, i.e. they must ensure that the parts are held relative to one another under such loads. The "loads" (or load factors) correspond to the forces that are associated with the accelerations to which the engine is subjected, and they are expressed as a number of gs. Limit loads correspond to the greatest loads that might be encountered under operating conditions (air pocket or very difficult landing). Nevertheless, safety regulations in the field of aviation also define an even greater level of loading referred to as the "ultimate" load or the "extreme" load. In the absence of any particular provisions, the extreme load is generally defined by multiplying the limit load by a safety factor. For example, the ultimate load threshold may be 1.5 times the limit load threshold.

It is difficult to justify making the flexible fastener tabs to be capable of withstanding ultimate loads. In order to withstand ultimate loads, the flexible fastener tabs would need to present very considerable thickness both in the tab body forming the resiliently flexible link between the two parts and in the portions where the tab is fastened to the CMC part. Such reinforcement of the fastener tabs would lead to an excessive increase in overall weight, in contradiction to the weight saving to be expected from using CMC parts, and also making the connection stiffer.

OBJECT AND SUMMARY OF THE INVENTION

An object of the present invention is to provide a novel design for the connection between a CMC part and a part made of a metallic material in an aeroengine after-body, which design ensures that the CMC part can withstand ultimate loads, and does so without degrading the flexibility of the connection, while complying with the target weight saving.

In a first embodiment, this object is achieved by an after-body assembly for an aeroengine, the assembly comprising an annular part made of metallic material secured to the aeroengine and an after-body part made of CMC, the after-body part being mounted on the annular part by resiliently flexible fastener tabs, the assembly being characterized in that each fastener tab includes an axial abutment element that extends radially from the second end of the tab, at least part of said axial abutment element facing the first end and a radial abutment element at the second end of the tab, said radial abutment element at least partially overlying the first end.

Thus, with these axial and radial abutment elements incorporated in the fastener tabs, it is possible to withstand ultimate loads, and to do so without specifically reinforcing the structure of the tabs, i.e. without making them heavier. Because of their incorporated abutments, the fastener tabs, which are dimensioned to provide predefined clearance between the two parts only when subjected to normal and limit loads, also enable the CMC after-body part to come into abutment with the annular part secured to the engine under greater loads, and in particular under the ultimate load. Thus, under such loads, this avoids the CMC part from becoming detached from the annular part that is secured to the engine.

In addition, the radial and/or axial contact serves to provide a plurality of force-transmission paths, thereby serving to reduce stresses in the CMC pert.

In another embodiment of the invention, the problem of a flexible connection between a CMC after-body part and a metallic annular part secured to a casing of an aeroengine withstanding ultimate loads may be solved by mounting the after-body part downstream from the annular part, the edge of the upstream portion of the after-body part being held facing the annular part in the axial direction and at least partially overlying the first ends of the fastener tabs.

Thus, by positioning the edge of the upstream portion of the CMC after-body part in this manner relative to the annular part, it is possible to ensure that radial and/or axial contact is established between the CMC part and the metallic ring in the event of large loads such as ultimate loads, and to do so with flexible connection tabs that are dimensioned solely for ensuring predefined clearance between the two parts under normal and limit loads.

According to an aspect of the invention, the first end of each fastener tab further includes a stub that extends axially in a direction away from the annular part in order to make it easier to establish contact against said end.

The invention also relates to an aeroengine including an after-body assembly of the invention.

BRIEF DESCRIPTION OF THE DRAWINGS

Other characteristics and advantages of the invention appear from the following description of particular embodiments of the invention given by way of non-limiting examples, with reference to the accompanying drawings, in which.

DETAILED DESCRIPTION OF AN EMBODIMENT

Figure 1:
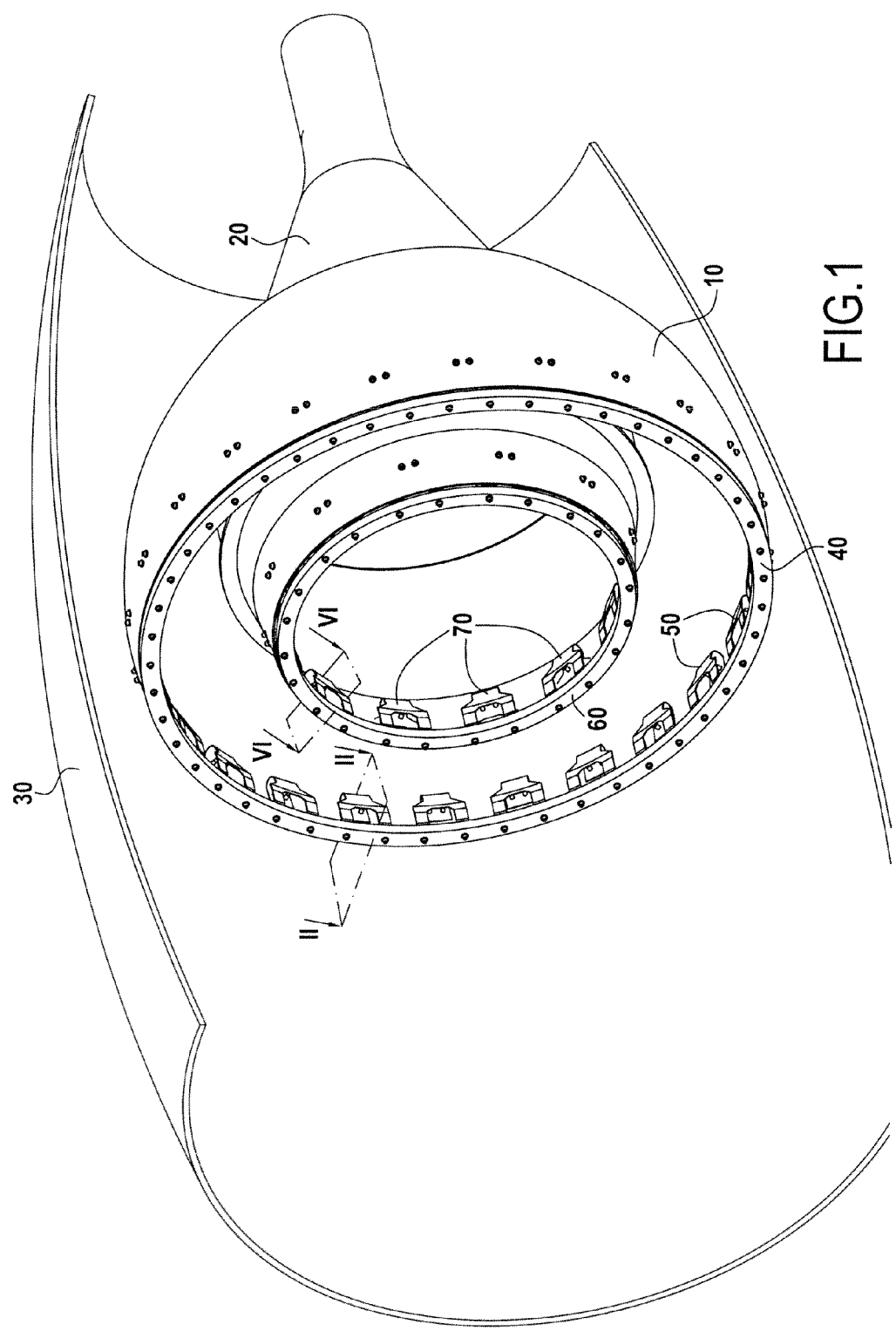
FIG. 1 is a perspective view of an aeroengine after-body in accordance with an embodiment of the invention.

FIG. 1 shows a turbojet after-body constituting the exhaust system of the turbojet. The after-body comprises an ejection nozzle or primary nozzle 10 and a central body or exhaust cone 20 (also known as a "plug"), both located at least in part inside a nacelle 30. The primary nozzle 10 and the exhaust cone 20 are made of CMC material.

In well-known manner, CMC material parts are constituted by fiber reinforcement made of refractory fibers (carbon or ceramic fibers) and densified by a ceramic matrix, in particular a carbide, a nitride, a refractory oxide, . . . . Typical examples of CMC materials are C—SiC materials (carbon fiber reinforcement and silicon carbide matrix), SiC—SiC materials, and C—C/SiC materials (having a mixed matrix with both carbon and silicon carbide). The fabrication of CMC material parts is well known. The fiber reinforcement may be densified by a liquid technique (impregnation with a ceramic matrix precursor resin and transformation into ceramic by curing and pyrolysis, which process may be repeated), or by a gas technique (chemical vapor infiltration).

The primary nozzle 10 is fastened by means of resiliently flexible fastener tabs 50 to a first metal fastener ring 40 that forms part of or is designed to be fastened to the casing of the engine (not shown). These elements form a first after-body assembly of the invention.

The exhaust cone 20 is fastened by means of elastically deformable fastener tabs 70 to a second metal fastener ring 60 that also forms part of the engine casing or that is designed to be fastened thereto. These elements form a second after-body assembly of the invention.

In the present invention, the fastener tabs are made of a refractory metallic material such as in particular: Inconel®, Hastelloy®, or Waspalloy®. Depending on the size and the weight of the CMC part, the fastener tabs are dimensioned to be capable of mechanically withstanding normal and limit loads that correspond to maintaining radial and axial clearance between the CMC part and the metal part in order to be capable of accommodating differential expansion and of damping vibration.

Furthermore, the mechanical behavior of the fastener tabs when subjected to the greatest loads, and in particular ultimate loads, corresponds to maintaining the integrity of the fastening of the CMC part to the metal part (no rupture of the fastener tabs) and to limiting the forces exerted on the CMC part.

Figure 2:
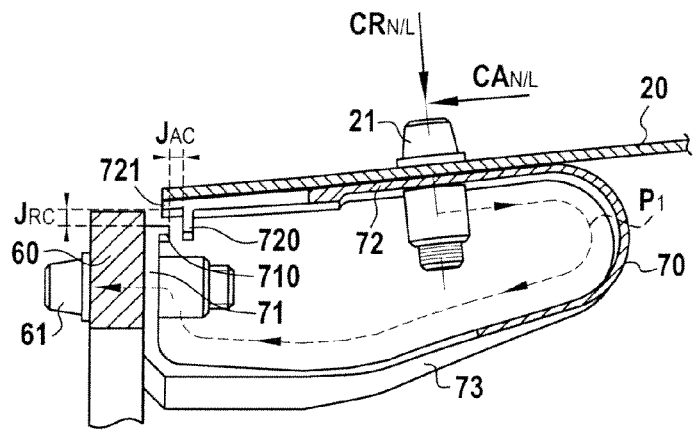
FIGS. 2 to 5 are fragmentary section views showing a fastener tab of the exhaust cone of the FIG. 1 after-body under different loads.

A first embodiment of the invention is shown in FIGS. 2 to 5. FIG. 2 shows a fastener tab 70 comprising a body 73 that extends between a first end 71 and a second end 72. The body 73 presents a curved shape that gives the tab its resilient flexibility. The first end 71 is fastened to the metal ring 60 by nut-and-bolt type fastener members 61. Similarly, the second end 72 is fastened to the upstream portion of the exhaust cone 20 by nut-and-bolt type fastener members 21. In FIG. 2, the fastener tab 70 is shown under operating conditions under a normal or limiting radial load $CR_{N/L}$ and under a normal or limiting axial load $CA_{N/L}$. Under such conditions, radial clearance $J_{RC}$ and axial clearance $J_{AC}$ are maintained between the two ends 71 and 72 of the tab 70, and consequently between the CMC cone 20 and the metal ring 60. The forces exerted on the cone 20 are transmitted to the ring 60 via a path $P_1$ formed by the body 73 of the tab between the second end 72 where it is fastened to the cone 20 and the first end 71 where it is fastened to the ring 60.

The fastener tab 70 also includes an axial abutment element 720 that extends radially from the second end 72, facing the first end 71, and also a radial abutment element 721 that extends axially from the second end 72 and overlies the first end 71. In the embodiment described herein, the radial abutment element 721 corresponds to an extension of the second end 72.

Figure 3:
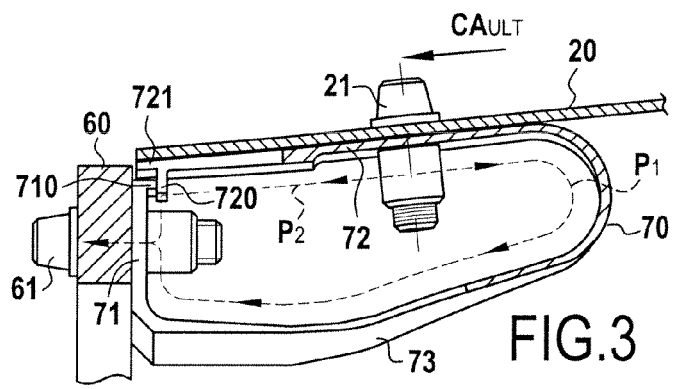

In FIG. 3, the fastener tab 70 is subjected to an axial load $CA_{ULT}$ that is significantly greater than the limit load, e.g. the ultimate load. Under such conditions, the axial abutment element 720 comes into contact with the first element 71 of the tab 70 (axial clearance $J_{AC}=0$). This abutting configuration serves to form, in addition to the path $P_1$, another path $P_2$ for transmitting forces exerted on the cone 20, thereby reducing stresses in the cone 20.

Figure 4:
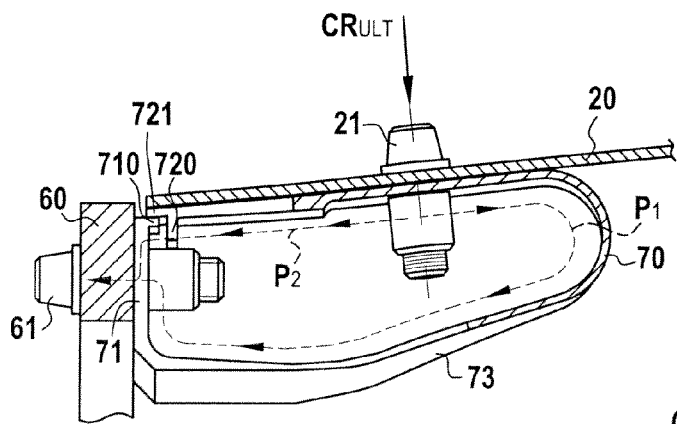

In FIG. 4, the fastener tab 70 is subjected to a radial load $CR_{ULT}$ that is significantly greater than the limit load, e.g. the ultimate load. Under such conditions, the radial abutment element 721 comes into contact with the first end 71 of the tab 70 (radial clearance $J_{RC}=0$). This abutting configuration serves to form, in addition to the path $P_1$, another path $P_2$ for transmitting forces exerted on the cone 20, thereby reducing the stresses therein.

Figure 5:
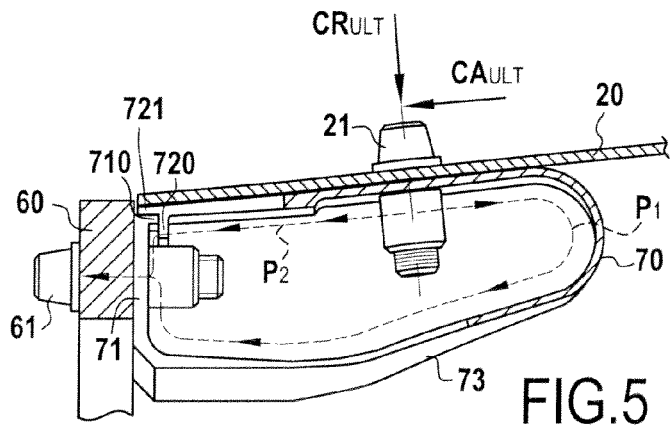

In FIG. 5, the fastener tab 70 is subjected both to an axial load $CA_{ULT}$ and to a radial load $CR_{ULT}$, which loads are significantly greater than the limit load (e.g. the ultimate load). Under such conditions, the axial abutment element 720 and the radial abutment element 721 are both in contact with the first end 71 of the tab 70 (axial clearance $J_{AC}=0$ and radial clearance. $J_{RC}=0$). Both force-transmission paths $P_1$ and $P_2$ remain present.

In the embodiment described herein, the first end 71 is provided with a stub 710 facilitating contact between the radial abutment element 721 and the end 71. Nevertheless, the first end 71 need not include such a stub, providing the radial abutment element 721 overlies the first end 71.

Figure 6:
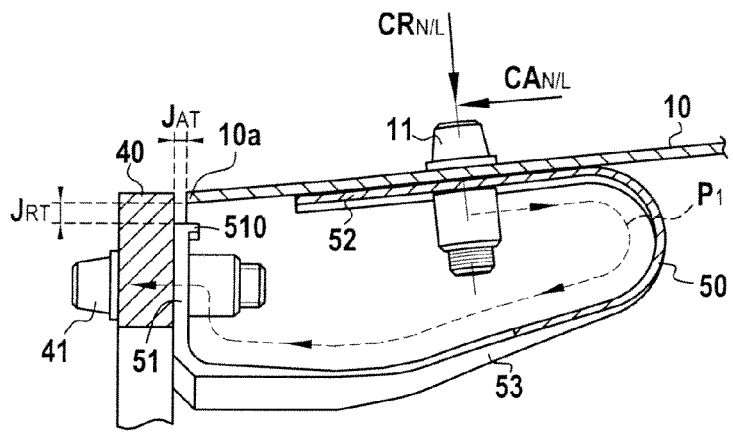
FIGS. 6 to 9 are fragmentary section views showing a fastener tab of the primary nozzle of the FIG. 1 after-body under different loads.

FIGS. 6 to 9 show another embodiment of the present invention that differs from the embodiment shown in FIGS. 2 to 5 in that the axial and radial abutments are made directly by the CMC part contacting the part and/or the end of the fastener tab. For this purpose, the primary nozzle 10 is mounted downstream from the metal ring 40 by the fastener tab 50. More precisely, and as shown in FIG. 6, the edge 10a of the upstream portion of the nozzle 10 is held both facing the ring 40 in the axial direction and overlying the first ends 51 of the fastener tabs 50. Each fastener tab 50 comprises a body 53 that extends between the first end 51 and a second end 52. The body 53 presents a curved shape that imparts its resilient flexibility to the tab. The first end 51 is fastened to the metal ring 40 by nut-and-bolt type fastener members 41. Similarly, the second end 52 is fastened to the upstream portion of the nozzle 10 by nut-and-bolt type fastener members 11.

In FIG. 6, the fastener tab 50 is shown in operating conditions under normal or limiting radial load $CR_{N/L}$ and normal or limiting axial load $CA_{N/L}$. Under such conditions, radial clearance $J_{RT}$ is maintained between the edge 10a of the end of the nozzle 10 and the first end 51 of the tab 50, and axial clearance $J_{AT}$ is maintained between the edge 10a of the end of the nozzle 10 and the ring 40. The forces exerted on the nozzle 10 are transmitted to the ring 40 via a path $P_1$ formed by the body 53 of the tab between the second end 52 where it is fastened to the nozzle 10 and the first end 51 where it is fastened to the ring 40.

Figure 7:
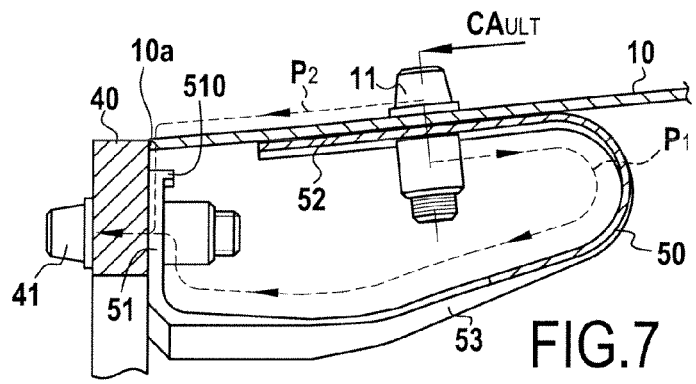

In FIG. 7, the fastener tab 50 is subjected to an axial load $CA_{ULT}$ that is significantly greater than the limit load, e.g. the ultimate load. Under such conditions, the edge 10a of the upstream portion of the nozzle 10 comes into contact with the ring 40 (axial clearance $J_{AT}=0$). This contacting configuration serves to form an additional path $P_2$ for transmitting forces exerted on the nozzle 10 and thus for reducing the stresses thereon.

Figure 8:
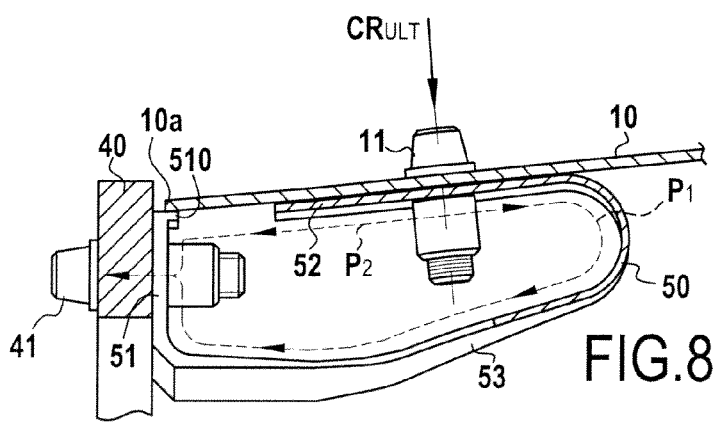

In FIG. 8, the fastener tab 50 is subjected to a radial load $CR_{ULT}$ that is significantly greater than the limit load (e.g. the ultimate load). Under such conditions, the edge 10a of the upstream portion of the nozzle 10 comes into contact with the first end 51 of the tab 50 (radial clearance $J_{RT}=0$). This contacting configuration also serves to form an additional path $P_2$ for transmitting forces exerted on the nozzle 10.

Figure 9:
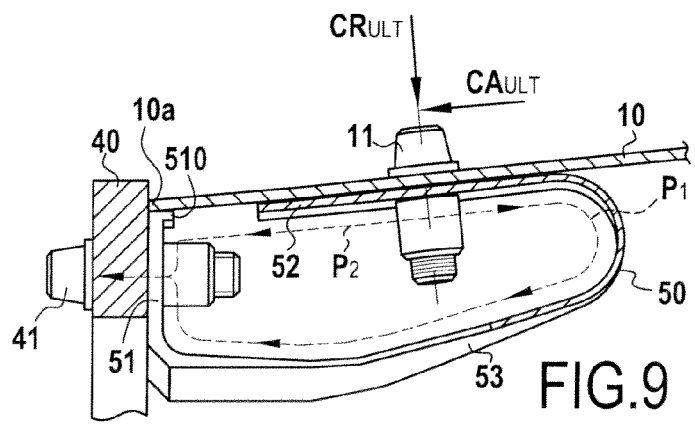

In FIG. 9, the fastener tab 50 is subjected simultaneously to an axial load $CA_{ULT}$ and to a radial load $CR_{ULT}$ which loads are significantly greater than the limit load (e.g. the ultimate load). Under such conditions, the edge 10a of the upstream portion 10 comes into contact both with the first end 51 of the tab 50 (radial clearance $J_{RT}=0$) and with the ring 40 (axial clearance $J_{AT}=0$). Both force-transmission paths $P_1$ and $P_2$ remain present.

In the embodiment described herein, the first end 51 is provided with a stub 510 for facilitating contact between the end of the nozzle 10 and the end 51 of the tab 50. Nevertheless, the first end 51 need not include such a stub, providing the edge 10a of the nozzle overlies the first end 51.

Figure 10:
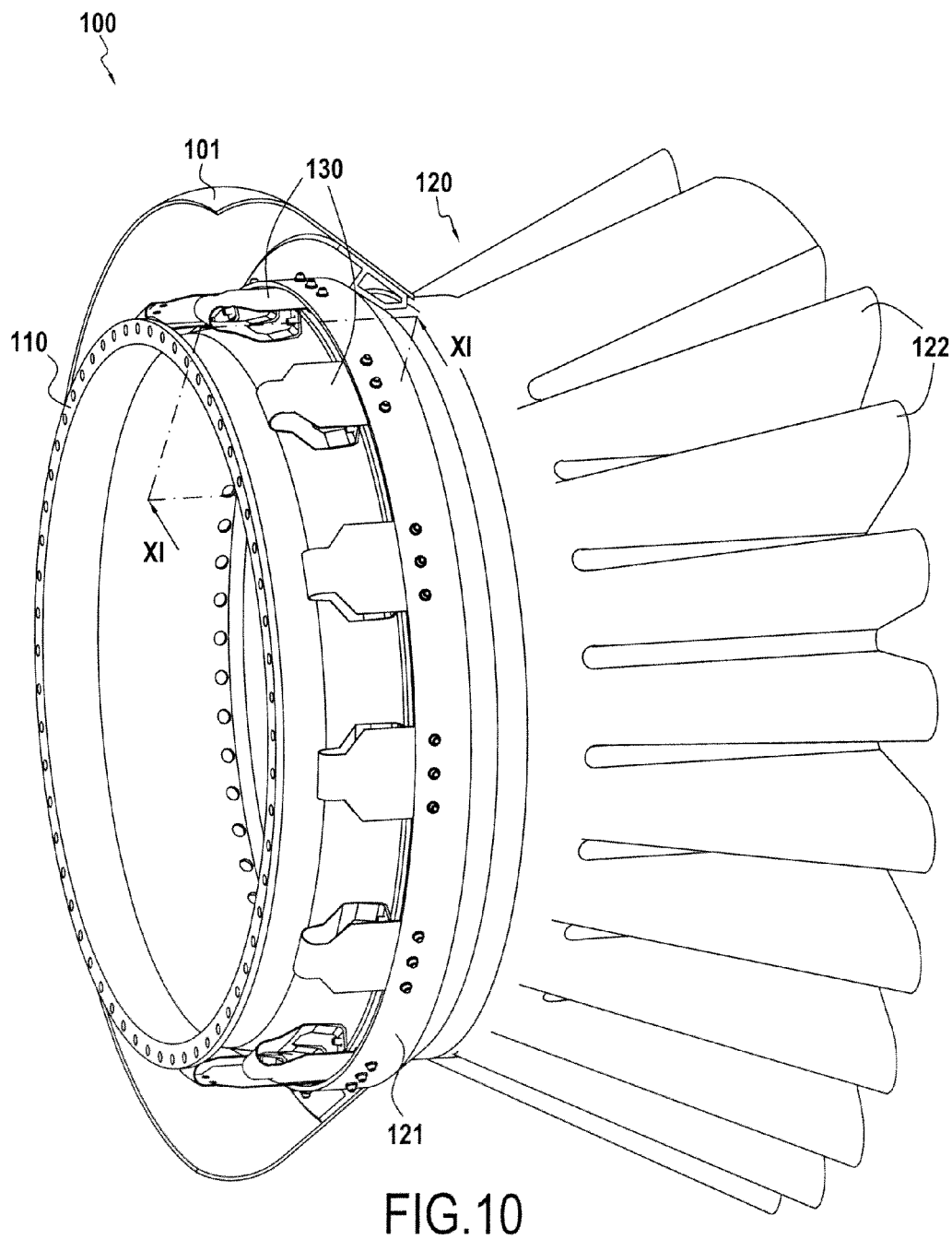
FIG. 10 is a perspective view of an aeroengine mixer in accordance with an embodiment of the invention.

FIG. 10 shows a mixer 100 for a turbomachine nozzle having separate streams (a primary stream and a secondary stream), which mixer constitutes an after-body assembly in accordance with an embodiment of the invention. The mixer comprises a fastener shroud 110 made of metallic material for connecting the mixer to the exhaust casing of a turbojet (not shown), a lobed structure 120 made of CMC, embodiments of which are described in particular in documents WO 2008/104692 and WO 2008/139114, the contents of which are incorporated herein by reference, and an outer cap 101. The lobed structure 120 presents an upstream portion 121 forming a body of revolution and a downstream portion that is of undulating shape defining a plurality of lobes 122. In known manner, the use of such a lobed structure in a nozzle having a primary and secondary stream mixer serves to control the mixing between the two streams so as to improve the performance of the turbojet and so as to reduce the noise it emits.

Figure 11:
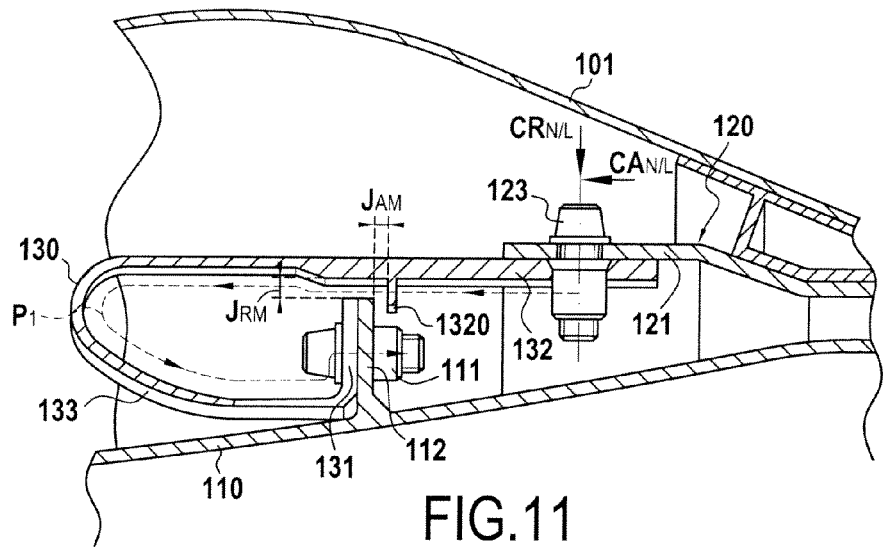
FIGS. 11 to 14 are fragmentary section views showing a fastener tab of the lobed structure of the FIG. 10 mixer under different loads.

In accordance with the invention, the lobed structure 120 is fastened to the fastener shroud 110 by means of resiliently flexible fastener tabs 130. More precisely, and as shown in FIG. 11, each fastener tab comprises a body 133 that extends between a first end 131 and a second end 132. The body 133 presents a curved shape that imparts its resilient flexibility to the tab. The first end 131 is fastened to a fastener flange 112 of the metal fastener shroud 110 by nut-and-bolt type fastener members 111. Similarly, the second end 132 is fastened to the upstream portion 121 of the lobed structure 120 by nut-and-bolt type fastener members 123. The fastener tab 130 also includes an axial abutment element 1320 that extends radially from the second portion 132 so as to face both the fastener flange 112 and the first end 131. In the embodiment described herein, the radial abutment element is constituted by the portion of the second end 132 that is situated overlying the first end 131.

In FIG. 11, the fastener tab 130 is shown in operating conditions under normal or limiting radial load $CR_{N/L}$ and under normal or limiting axial load $CA_{N/L}$. Under such conditions, radial clearance $J_{RM}$ is maintained between the two ends 131 and 132 of the tab 130, and consequently between the lobed structure 120 and the fastener shroud 110. Axial clearance $J_{AM}$ is also maintained between the axial abutment element 1320 and the fastener flange 112. The forces exerted on the lobed structure 120 are transmitted to the shroud 110 via a path $P_1$ formed by the body 133 of the tab between the second end 132 where it is fastened to the lobed structure 120 and the first end 131 where it is fastened to the shroud 110.

Figure 12:
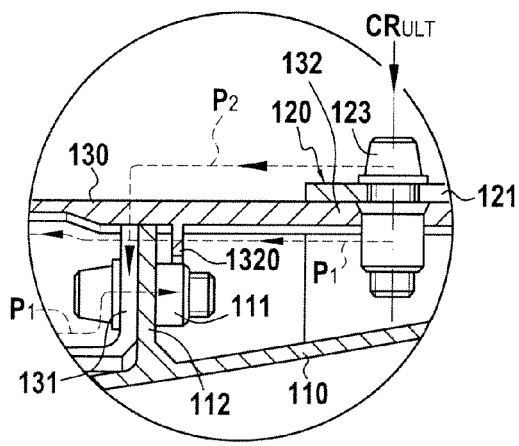

In FIG. 12, the fastener tab 130 is subjected to a radial load $CR_{ULT}$ that is significantly greater than the limit load, such as the ultimate load, for example. Under such conditions, the second end 132 of the tab 130 comes into contact with the first end 131 of the tab 130 (radial clearance $J_{RM}=0$). This contacting condition serves to form, in addition to the path $P_1$, another path $P_2$ for transmitting forces exerted on the lobed structure 120 and thus for reducing the stresses therein.

Figure 13:
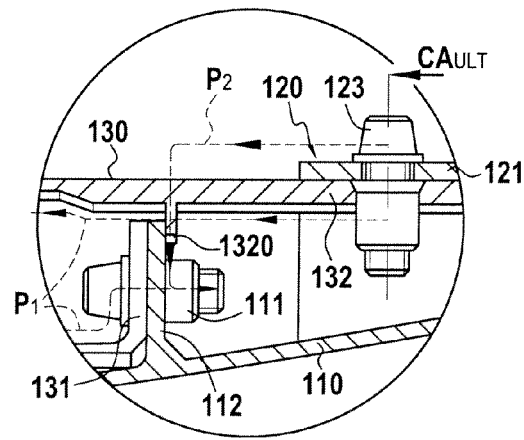

In FIG. 13, the fastener tab 130 is subjected to an axial load $CA_{ULT}$ that is significantly greater than the limit load, such as the ultimate load, for example. Under such conditions, the axial abutment element 132 comes into contact with the fastener flange 112 that is itself in contact with the first end 131 of the tab 130 (axial clearance $J_{AM}=0$). These contacting conditions serve to form, in addition to the path $P_1$, another path $P_2$ for transmitting forces exerted by the lobed structure 120 and thus for reducing the stresses thereon.

Figure 14:
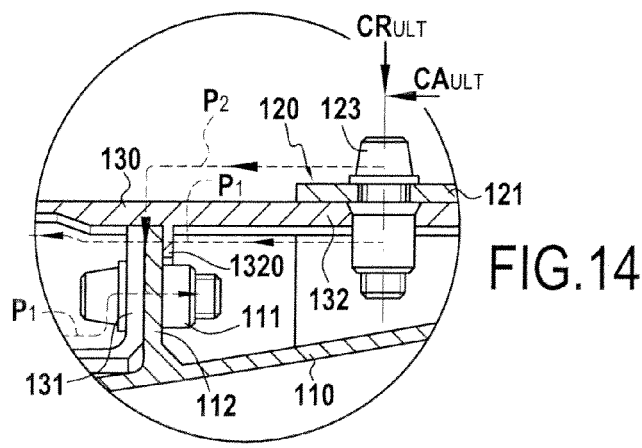

In FIG. 14, the fastener tab 130 is subjected both to an axial load $CA_{ULT}$ and to a radial load $CR_{ULT}$, which loads are significantly greater than the limit load (e.g. the ultimate load). Under such conditions, the axial abutment element 1320 comes into contact with the fastener flange 112 that is itself in contact with the first end 131 of the tab 130 (axial clearance $J_{AM}=0$), and the second end 132 of the tab 130 comes into contact with the first end 131 of the tab 130 (radial clearance $J_{RM}=0$). Both of the force-transmission paths $P_1$ and $P_2$ continue to be present.

The invention claimed is:

1. An after-body assembly for an aeroengine, the assembly comprising, along an axial direction:
    an annular part made of metallic material secured to the aeroengine; and
    an after-body part made of ceramic matrix composite material presenting the form of a body of revolution at least in an upstream portion of the after-body part, the after-body part being mounted on the annular part by resiliently flexible fastener tabs, each resiliently flexible fastener tab having a first end fastened to the annular part and a second end fastened to the upstream portion of the after-body part,
    wherein each resiliently flexible fastener tab includes an axial abutment portion and a radial abutment portion, the axial abutment portion extending radially from the second end of the resiliently flexible fastener tab and disposed to face the first end of the resiliently flexible fastener tab along the axial direction, the radial abutment portion disposed at the second end of the resiliently flexible fastener tab and configured to overly the first end of the resiliently flexible fastener tab along a radial direction.

2. The assembly according to claim 1, wherein the first end of each resiliently flexible fastener tab further includes a stub that extends axially in a direction away from the annular part.

3. The assembly according to claim 1, wherein the resiliently flexible fastener tabs are made of a refractory metallic material selected from at least: Inconel®; Hastelloy®; and Waspalloy®.

4. The assembly according to claim 1, wherein the radial abutment portion corresponds to an extension in the axial direction of the second end of the resiliently flexible fastener tab beyond the axial abutment portion.

5. The assembly according to claim 4, wherein the after-body part is an exhaust cone.

6. The assembly according to claim 1, wherein the radial abutment portion corresponds to a portion of the second end of the resiliently flexible fastener tab situated overlying the first end of the of the resiliently flexible fastener tab.

7. The assembly according to claim 6, wherein the after-body part is a lobed structure.

8. An after-body assembly for an aeroengine, the assembly comprising, along an axial direction:

an annular part made of metallic material secured to the aeroengine; and an after-body part made of ceramic matrix composite material presenting the form of a body of revolution at least in an upstream portion of the after-body part, the after-body part being mounted on the annular part by resiliently flexible fastener tabs, each resiliently flexible fastener tab having a first end fastened to the annular part and a second end fastened to the upstream portion of the after-body part, wherein the after-body part is mounted downstream from the annular part with an edge of the upstream portion of the after-body part being held to face an outer radial surface of the annular part along the axial direction and held to overlie the first ends of the resiliently flexible fastener tabs along a radial direction, and wherein, a stub, extending axially in a direction away from the annular part, is disposed on a terminal part of the first end of each resiliently flexible fastener tab.

9. The assembly according to claim 8, wherein the resiliently flexible fastener tabs are made of a refractory metallic material selected from at least: Inconel®; Hastelloy®; and Waspalloy®.

10. The assembly according to claim 8, wherein the after-body part is an exhaust nozzle.

11. An aeroengine, comprising an after-body assembly according to claim 1.

12. An aeroengine, comprising an after-body assembly according to claim 8.

* * * * *